(12) United States Patent
Gottin et al.

(10) Patent No.: US 11,275,987 B1
(45) Date of Patent: Mar. 15, 2022

(54) METHOD AND APPARATUS FOR OPTIMIZING PERFORMANCE OF A STORAGE SYSTEM

(71) Applicant: EMC IP HOLDING COMPANY LLC, Hopkinton, MA (US)

(72) Inventors: Vinicius Michel Gottin, Rio de Janeiro (BR); Jonas Furtado Dias, Rio de Janeiro (BR); Tiago Salviano Calmon, Rio de Janeiro (BR); Alex Laier Bordignon, Rio de Janeiro (BR); Daniel Sadoc Menasché, Rio de Janeiro (BR)

(73) Assignee: Dell Products, L.P., Hopkinton, MA (US)

( * ) Notice: Subject to any disclaimer, the term of this patent is extended or adjusted under 35 U.S.C. 154(b) by 376 days.

(21) Appl. No.: 16/505,767

(22) Filed: Jul. 9, 2019

(51) Int. Cl.
  *G06N 3/04* (2006.01)
  *G06F 3/06* (2006.01)
  *G06K 9/62* (2006.01)

(52) U.S. Cl.
  CPC ............... *G06N 3/04* (2013.01); *G06F 3/061* (2013.01); *G06F 3/0653* (2013.01); *G06F 3/0673* (2013.01); *G06K 9/6256* (2013.01); *G06K 9/6264* (2013.01)

(58) Field of Classification Search
  None
  See application file for complete search history.

(56) References Cited

U.S. PATENT DOCUMENTS

| 2019/0147371 A1* | 5/2019 | Deo | G06N 20/00 706/12 |
| 2019/0243570 A1* | 8/2019 | Mittal | G06F 3/0646 |

OTHER PUBLICATIONS

M. Hashemi et al., "*Learning Memory Access Patterns*," NIPS, 2018, (15 pages).
C. Ruemmler et al., "*UNIX Disk Access Patterns*," Hewlett-Packard Laboratories Technical Report HPL-92-152, Dec. 1992 (18 pages).
R. Karedla, et al., "*Caching Strategies to Improve Disk System Performance*," IEEE Computer, No. 3, pp. 38-46, 1994.
A. E. Papathanasiou et al., "*Energy efficient prefetching and caching*," USENIX Annual Technical Conference, pp. 255-268, 2004 (14 pages).

(Continued)

*Primary Examiner* — Idriss N Alrobaye
*Assistant Examiner* — Dayton Lewis-Taylor
(74) *Attorney, Agent, or Firm* — Anderson Gorecki LLP

(57) ABSTRACT

A method for optimizing performance of a storage system includes creating a structured state index from a universe of I/O traces of memory access operations in a storage system. The structured state index is validated against a target metric operational parameter of the storage system. If the structured state index has correlation against the target metric operational parameter of the storage system, the structured state index is used as input to a decision-making task. The decision-making task may be implemented as a deep neural network and the structured state index is used as input training data for the deep neural network. Once the decision-making task has been trained using the structured state index, the decision-making task is used in a predictive manner to generate a predicted target metric operational parameter of the storage system given a proposed storage policy.

17 Claims, 13 Drawing Sheets

(56) References Cited

OTHER PUBLICATIONS

K. Simonyan, et al., *"Very Deep Convolutional Networks for Large-Scale Image Recognition,"* arXiv preprint arXiv: 1409.1556, 2014 (14 pages).
V. Mnih, et al., *"Human-Level Control Through Deep Reinforcement Learning,"* Nature, vol. 518, p. 529-33, 2015 (13 pages).
V. Mnih, et al., *"Playing Atari With Deep Reinforcement Learning,"* arXiv preprint ArXiv: 1312.5602, 2013 (9 pages).
J. Schulman, et al., *"Proximal Policy Optimization Algorithms,"* CoRR, vol. abs/1707.06347, 2017 (12 pages).

\* cited by examiner

METHOD AND APPARATUS FOR OPTIMIZING PERFORMANCE OF A STORAGE SYSTEM

BACKGROUND

This disclosure relates to computing systems and related devices and methods, and, more particularly, to a method and apparatus for optimizing performance of a storage system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a data reduction approach is used to represent the state space of a storage system. Each state is composed of data from a window comprising the previous w disk accesses. Relevant features are extracted from such window, and cache parameterization or other storage system operational characteristics are learned from such features. This compact representation is useful to simplify tasks of applications downstream and to attend the strict time constraints of real-time inference. It enables the use of machine learning tools, such as auto-encoders and convolutional neural networks, to automatically augment the state with additional features.

To validate the proposed state characterization, the cross-correlation between the time series of states visited by the proposed state representation and the target metric of interest is leveraged. The cross-correlation between time series, in turn, is also instrumental to produce additional features in an optional composition process. In some embodiments, this validation employs a pragmatic approach to assess the performance of the proposed characterization through the comparison of the performance of the application of interest against other alternative state characterizations.

In some embodiments, a method for optimizing performance of a storage system includes creating a structured state index from raw I/O traces of memory access operations in a storage system and validating the structured state index against a target metric operational parameter of the storage system. If the structured state index has correlation against the target metric operational parameter of the storage system, the structured state index is used as input to a decision-making task. Once the decision-making task has been trained using the structured state index, the decision-making task is used in a predictive manner to generate a predicted target metric operational parameter of the storage system given a proposed storage policy.

In some embodiments, the decision-making task is a deep neural network and the structured state index comprises input training data for the deep neural network.

In some embodiments, the structured state index is formed as a series of states, each state being a vector of state elements, and each state element including an aggregate number of I/O operations to a contiguous range of a respective subset of memory addresses over a preceding window of time.

In some embodiments, if the structured state index does not have correlation against the target metric operational parameter of the storage system, the method further comprises the step creating a new structured state index. The structured state index may be created by aggregating I/O operations to a first number of bins of contiguous ranges of memory addresses, and the new structured state index may be created by aggregating I/O operations to a second number of bins of contiguous ranges of memory addresses. The structured state index may be created by aggregating I/O operations over a first time window, and the new structured state index is created by aggregating I/O operations over a second time window.

In some embodiments, the step of creating the structured state index includes creating an aggregate state index from the raw I/O traces of memory access operations and compositing the aggregate state index using an unsupervised or supervised learning process.

In some embodiments, the method also includes monitoring an output of the decision-making task to determine whether the output of the decision-making task correlates with an operational parameter of the storage system, and re-training the decision-making task if the output of the decision-making task does not correlate with the operational parameter of the storage system.

In some embodiments, the method also includes adjusting the operation of the storage system to implement the proposed storage policy when the predicted target metric operational parameter of the storage system output by the decision-making task is more optimal than a current operational state of the storage system.

In some embodiments, a storage system includes storage resources, a set of processors requiring access to data stored in the storage resources, a cache, and a storage system management and control application. In some embodiments, the storage system management and control application is configured to create a structured state index from raw I/O traces of memory access operations to the storage resources and validate the structured state index against a target metric operational parameter of the storage system. If the structured state index has correlation against the target metric operational parameter of the storage system, the storage system management and control application is configured to use the structured state index as training input to a decision-making task. Once the decision-making task has been trained using the structured state index, the storage system management and control application is configured to use the decision-making task in a predictive manner to generate a predicted target metric operational parameter of the storage system given a proposed storage policy. If the decision-making task determines that the proposed storage policy would improve performance of the storage system, the storage system management and control application is configured to implement the proposed storage policy on the storage system.

In some embodiments, the decision-making task is a deep neural network and the structured state index comprises input training data for the deep neural network.

In some embodiments, the structured state index is formed as a series of states, each state being a vector of state elements, and each state element including an aggregate number of I/O operations to a contiguous range of a respective subset of memory addresses over a preceding window of time.

In some embodiments, the if the structured state index does not have correlation against the target metric operational parameter of the storage system, the storage system management and control application is configured to create a new structured state index. In some embodiments, the structured state index is created by aggregating I/O operations to a first number of bins of contiguous ranges of memory addresses, and the new structured state index is created by aggregating I/O operations to a second number of bins of contiguous ranges of memory addresses. In some embodiments, the structured state index is created by aggregating I/O operations over a first time window, and the new structured state index is created by aggregating I/O operations over a second time window.

In some embodiments, the storage system management and control application is configured to create the structured state index by creating an aggregate state index from the raw I/O traces of memory access operations and compositing the aggregate state index using an unsupervised or supervised learning process.

In some embodiments, the storage system management and control application is configured to monitor an output of the decision-making task to determine whether the output of the decision-making task correlates with an operational parameter of the storage system, and re-train the decision-making task if the output of the decision-making task does not correlate with the operational parameter of the storage system.

DETAILED DESCRIPTION

Figure 1:
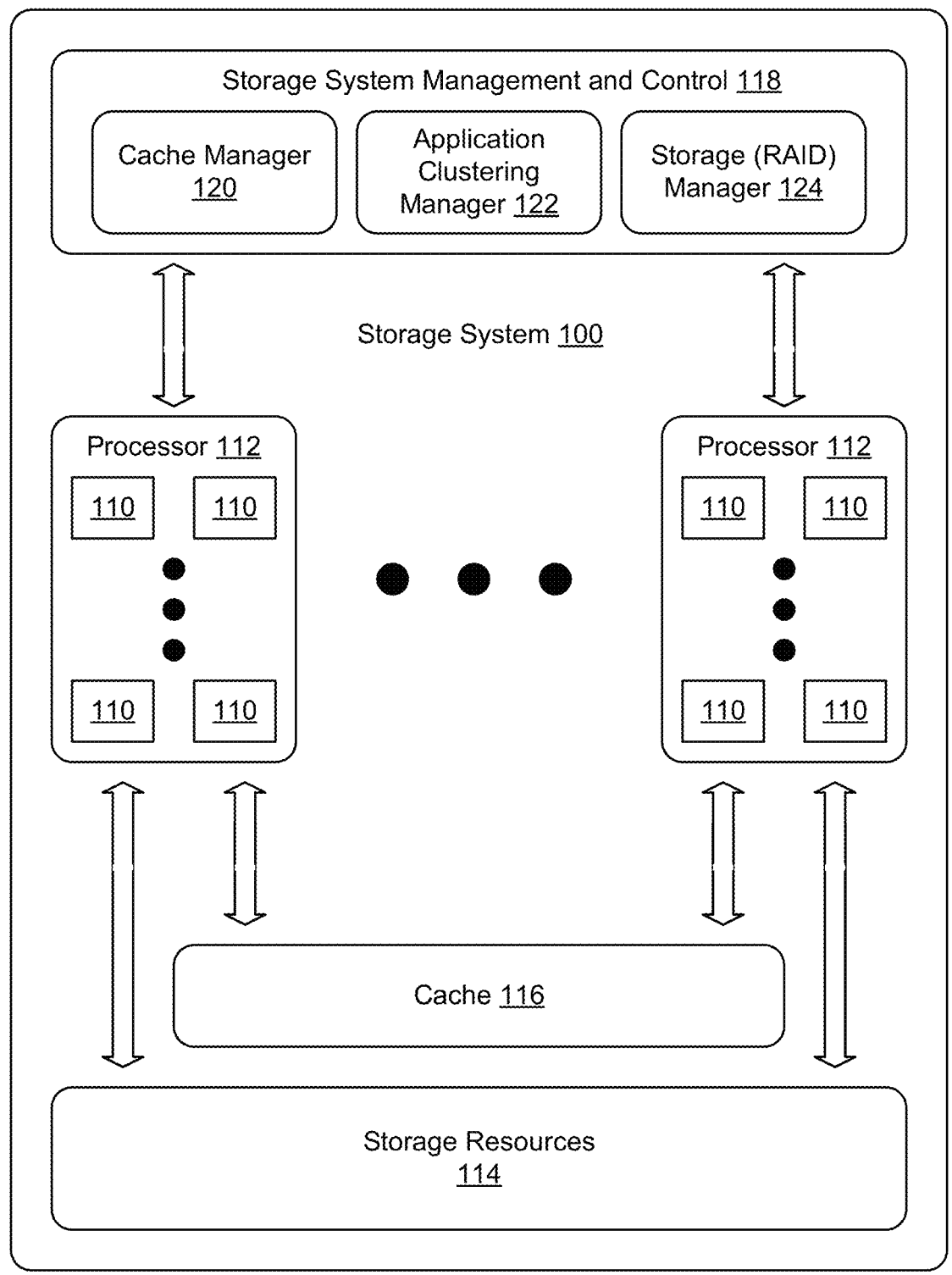
FIG. 1 is a functional block diagram of an example storage system configured according to some embodiments.

FIG. 1 shows an example storage system 100 in which one or more applications 110 are executing on one or more processors 112. Applications 110 access data stored in storage resources 114. A storage access operation will be referred to as an Input/Output (I/O) operation. Components of storage system 100 may be implemented in myriad ways. For example, in some implementations, applications run on virtual machines abstracted from processors 112 by a hypervisor (not shown). In other implementations, applications may run on individual processors 112 or may run on sets of processors 112.

One or more caches 116 are provided to accelerate processing of I/O operations. Reading data from a cache 116 typically exhibits lower latency than reading data from storage resources 114. Even when storage resources 114 use the same type of storage technology as the cache 116, e.g. both cache 116 and storage resources 114 are implemented using solid state flash drives, the latency associated with reading data from cache 116 may be significantly lower than latency associated with reading the same data from storage resources 114, e.g. due to proximity of the cache 116 to the processors 112.

Storage resources 114 and/or cache 116 may be directly connected to processors 112 or may be provided by a storage system 100 connected to the other components of the storage system 100 by a network (not shown). In other implementations, applications can run on processors 112 that are directly controlling the storage resources 114 and/or cache 116. One example storage system 100 is the PowerMax™ storage system 100 available from EMC/Dell™. Other types of storage systems 100 may likewise be used as well. The manner of optimizing performance of a storage system 100 described herein may be useful in connection with any storage system 100, regardless of the particular manner in which the storage system 100 is physically/logically implemented.

As shown in FIG. 1, in some embodiments the storage system 100 includes a storage system management and control application 118 configured to adjust the manner in which the components of the storage system 100 store data within the storage resources 114 and the manner in which the storage system 100 enables access to the data stored in storage resources 114. For example, by adjusting the manner in which applications access data of the storage system 100, it is possible for the storage system management and control application 118 to optimize performance of the storage system 100.

In some embodiments, the storage system management and control application 118 is run on an emulation (virtual machine) instantiated on one of the processors 112 of the storage system 100. In other embodiments, the storage system management and control application 118 is instantiated on a system external to the storage system 100, and is connected to the storage system 100 by a network.

Since reducing data access latency tends to increase performance of application 110, in some embodiments the storage system management and control application 118 includes a cache manager 120. One goal of the cache manager 120 is to attempt to place data into the cache 116 that is likely to be required by one or more of the applications 110. The term "cache hit" will be used herein to refer to an I/O operation that is able to read requested data from the cache 116. The term "cache miss" will be used herein to refer to an I/O operation that is not able to read requested data from the cache 116. By adjusting cache policies to optimize placement of data in the cache 116, it is possible to increase the number of cache hits to thereby decrease overall latency of the applications 110 executing in the context of the storage system 100 to thereby optimize performance of the storage system 100. Example adjustments to cache policies might include changing an amount of cache allocated to each application, adjusting how long data is retained in the cache, adjusting cache lookahead parameters, adjusting how much cache space is allocated to content that is requested once vs content that is requested two or more times (referred to as a herein), and other cache adjustments.

In some embodiments, the storage system management and control application 118 includes an application clustering manager 122. Since there is a limit on the rate at which a given processor 112 or set of processors 112 is able to retrieve data, changing which applications are assigned to a particular processor or set of processors can increase the overall performance of the set of applications within the storage system 100. For example, by balancing data intensive applications across the set of processors, it may be possible to increase the execution rate of the set of applications 110, as a whole, within the storage system 100. Likewise, causing applications to be closer to storage resources 114 that contain data being more frequently accessed by those applications can increase performance of the set of applications executing within the contexts of the storage system 100, to thereby optimize performance of the storage system 100.

In some embodiments, the storage system management and control application 118 includes a storage (RAID) manager 124. Adjusting how data is organized within storage resources 114 can affect overall performance of the set of applications 110 within the storage system 100, and accordingly optimize performance of the storage system 100.

To optimize performance of a storage system 100, the storage system management and control application 118 needs to know how the storage system 100 is currently operating. Specifically, the storage system management and control application 118 needs to have a characterization of the type of I/O operations being executed on the storage resources 114 to determine how to adjust policies of the storage system to optimize performance of the storage system 100. Depending on the type of I/O operations being executed on the storage resources 114, different policies should be used for better performance. For example, if a storage system is experiencing a high volume of consecutive data read operations, changing the cache look-ahead policy may cause the cache hit ratio to increase. Likewise, if the storage system is experiencing a high volume of repeat read operations (reading the same data), increasing the proportion of the cache allocated to store repeatedly read data may increase the cache hit ratio.

In some embodiments, the storage system management and control application 118 uses an efficient state representation to quantify performance of the storage system 100. Specifically, to optimize performance of the storage system 100, the storage system management and control application 118 first needs to characterize the current operational parameters of the storage system 100. Once the current state has been characterized, the storage system management and control application 118 uses predictive modeling using a neural network to determine whether adjusting one or more of the operational parameters (policies) of the storage system 100 would be beneficial. Example policies might relate to how the cache is allocated, how the applications are clustered, how the storage resources 114 themselves are used, or any number of other storage policies.

Determining how to represent the current state of the storage system 100 is not straightforward. Unfortunately, large storage systems 100 have a very large physical address space and, accordingly, simply looking at the I/O accesses to the physical address space of the storage resources 114 is too sparse to reveal meaningful insight as to how the storage system 100 is operating, or to predict how adjusting one or more of the storage policies would affect operation of the storage system 100.

According to some embodiments, a process is used to compose a compact state representation of disc access patterns in storage system 100. The state representation retains the recent history of accesses to the memory resources 114 in a compressed fashion and enables feature engineering and dimensionality reduction via machine learning techniques. The state representation can be used alone or in composed form to train a deep neural network, which then can be used to do predictive modeling of how adjusting one or more storage policies would affect operation of the storage system 100.

Figure 2:
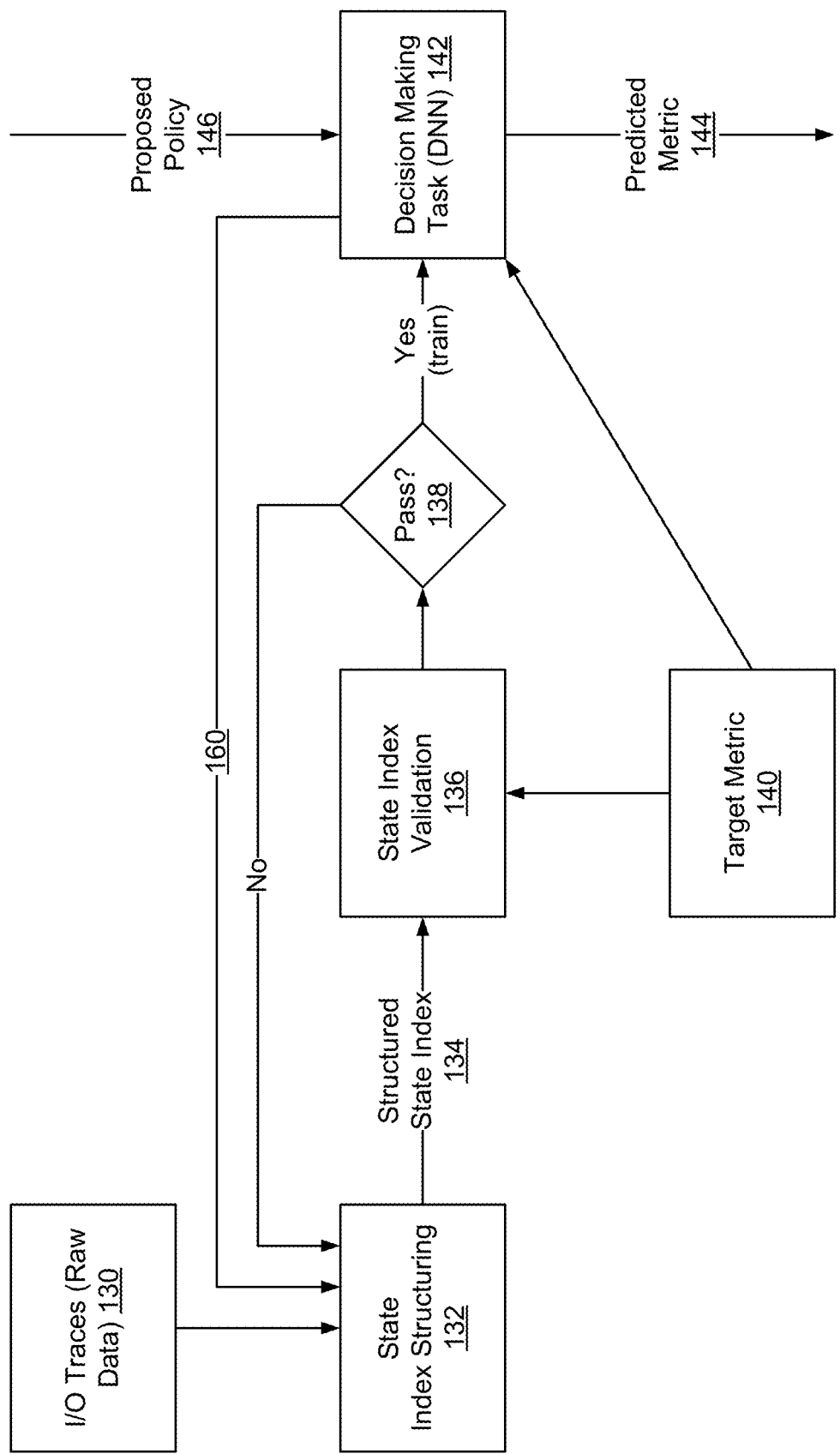
FIG. 2 is a functional block diagram of a storage system management and control application for use with the example storage system of FIG. 1 according to some embodiments.

FIG. 2 is a functional block diagram of a storage system management and control application 118 for use with the example storage system 100 of FIG. 1 according to some embodiments. As shown in FIG. 2, in some embodiments the I/O traces (raw data) 130 of memory access operations to storage resources 114 in the storage system 100 are used as input to a state index structuring process 132. As noted above, the raw I/O data is too sparse to provide meaningful insight to operation of the storage system 100. In some embodiments, the state index structuring process 132 extracts meaningful information from the raw data 130 and outputs a structured state index 134. The structured state index 134 is computed periodically, for example once every few seconds or every hundred milliseconds, and each index within the structured state index 134 is a vector describing the operational state of the storage system 100 at that point in time. Additional details of how the structured state index 134 is computed is described in greater detail below.

The structured state index 134 is validated at a state index validation process 136, which looks at whether the structured state index 134 is likely to be useful to provide meaningful insight as to how the storage system 100 is executing relative to the target metric 140. For example, in an embodiment looking to optimize the storage system 100 relative to cache utilization, the target metric 140 might be a cache hit ratio and the validation process 136 validates that the state index structuring process 136 is generating a structured state index 134 that is correlated to the actual cache hit ratio of the storage system 100. The performance evaluation of the feature selection and state characterization process is performed either in online or offline fashion.

If the structured state index does not pass the state index validation (a determination of NO at block 138), the state index structuring process 132 is adjusted to use different parameters to change how the structured state index 134 is calculated. This process iterates until the structured state index 134 is determined to sufficiently correlate with the target metric 140 (a determination of YES at block 138).

If the structured state index passes validation, in some embodiments the structured state index is used as training input to a decision-making task 142. In some embodiments, the decision-making task 142 is implemented as a deep neural network, and the structured state index is used to train the deep neural network to learn the correlation between the current operational parameters of the storage system 100 and the associated structured state index 134 computed using the raw I/O data of the current operation of the storage system 100. For example, in an embodiment looking to optimize the storage system 100 relative to cache utilization, the deep neural network implementing the decision-making task 142 is trained for a period of time to learn a correlation between the structured state index 134 and the cache hit ratio of the storage system 100.

Once the deep neural network implementing the decision-making task 142 is trained such that the predicted output of the decision-making task 142 approximates the operating parameter of interest of the storage system 100, the decision-making task 142 can be used to generate a predicted metric 144 indicative of how the storage system 100 would operate if one or more proposed policies 146 were to be implemented on the storage system 100.

Periodically, the predicted metric 144 is compared against operational state of the storage system 100, to determine if the output of the decision-making task 142 is sufficiently accurate. If the output of the decision-making task 142 no longer sufficiently tracks the performance of the storage system 100, the process can iterate (line 160) to re-structure the manner in which the state index structuring process 132 is used to create the structured state index, and once the new structured state index 134 is validated in block 136, the decision-making task 144 is then re-trained using the new structured state index 134.

FIGS. 3-6 are functional block diagrams of example state index structuring processes for use with the example storage system management and control application 118 of FIG. 2, according to some embodiments.

Figure 3:
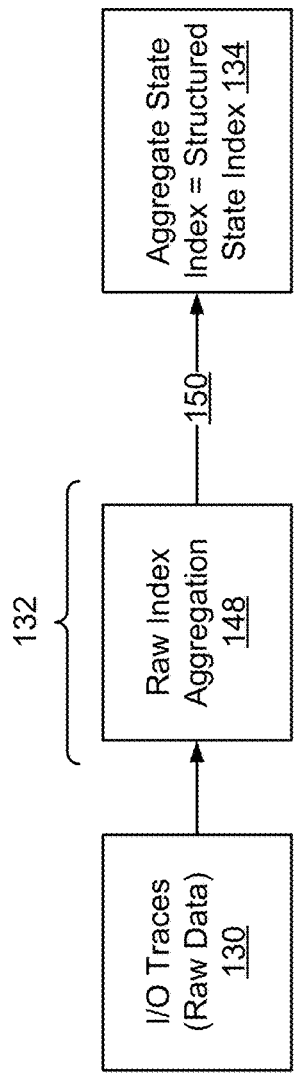
FIG. 3 is a functional block diagram of example state index structuring processes for use with the example storage system management and control application of FIG. 2 according to some embodiments.

As shown in FIG. 3, in some embodiments I/O traces (raw data 130) is aggregated at a raw index aggregation process 148, and an aggregated state index 150 output by the raw index aggregation process 148 is used as the structured state index 134.

Figure 4:
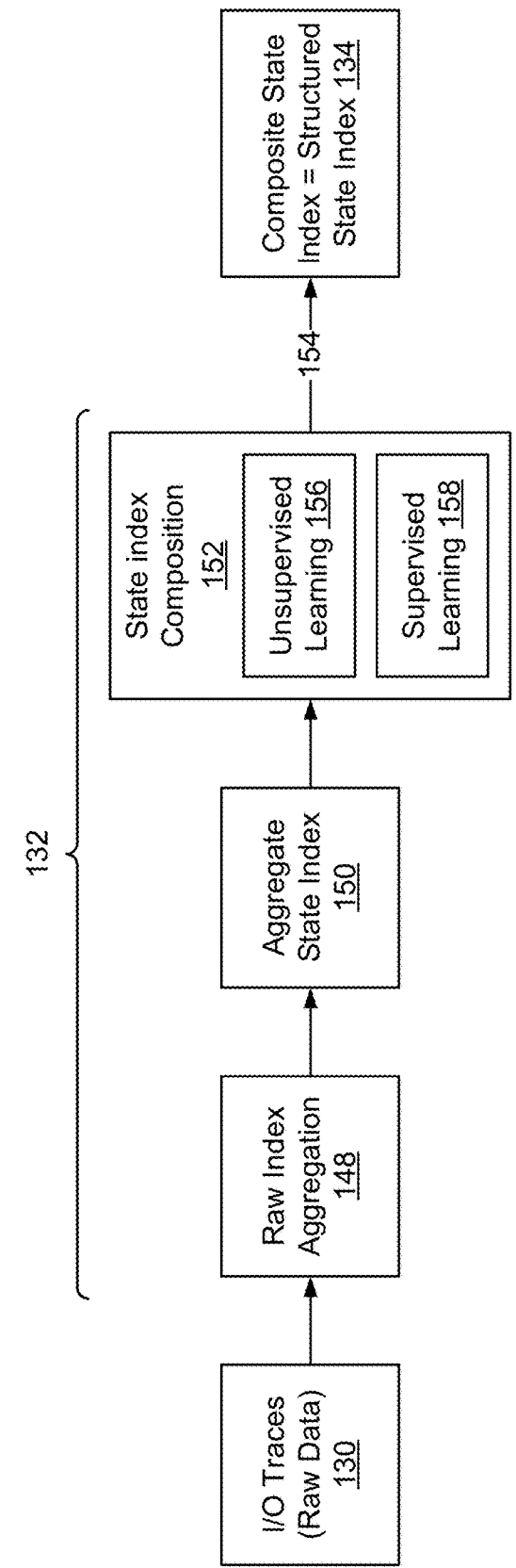
FIG. 4 is a functional block diagram of another example state index structuring processes for use with the example storage system management and control application of FIG. 2 according to some embodiments.

As shown in FIG. 4, in some embodiments I/O traces (raw data 130) is aggregated at a raw index aggregation process 148, and the aggregated state index 150 output by the raw index aggregation process 148 is passed to a state index composition process 152. In the embodiment shown in FIG. 4, a composite state index 154 output from the state index composition process 152 is used as the structure state index 134. Accordingly, as used herein, the term "structured state index" will be used as a generic term. In an embodiment in which a state index composition process 152 is not being used (FIG. 3), the term structured state index is used herein to refer to the aggregate state index. In an embodiment in which a state index composition process 152 is being used (FIG. 4), the term structured state index is used herein to refer to the composed aggregated structured state index, after the aggregate state index has been further processed by the state index composition process 152.

Figure 5:
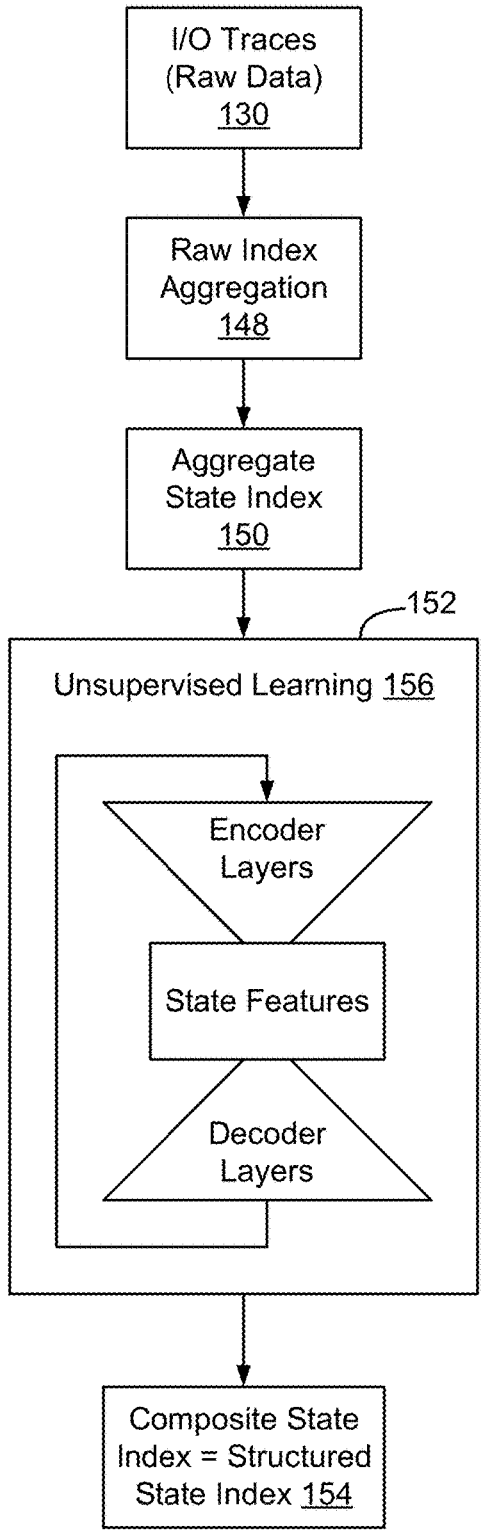
FIGS. 5 and 6 are functional block diagrams of the state index structuring process of FIG. 4 in greater detail according to some embodiments.
Figure 6:
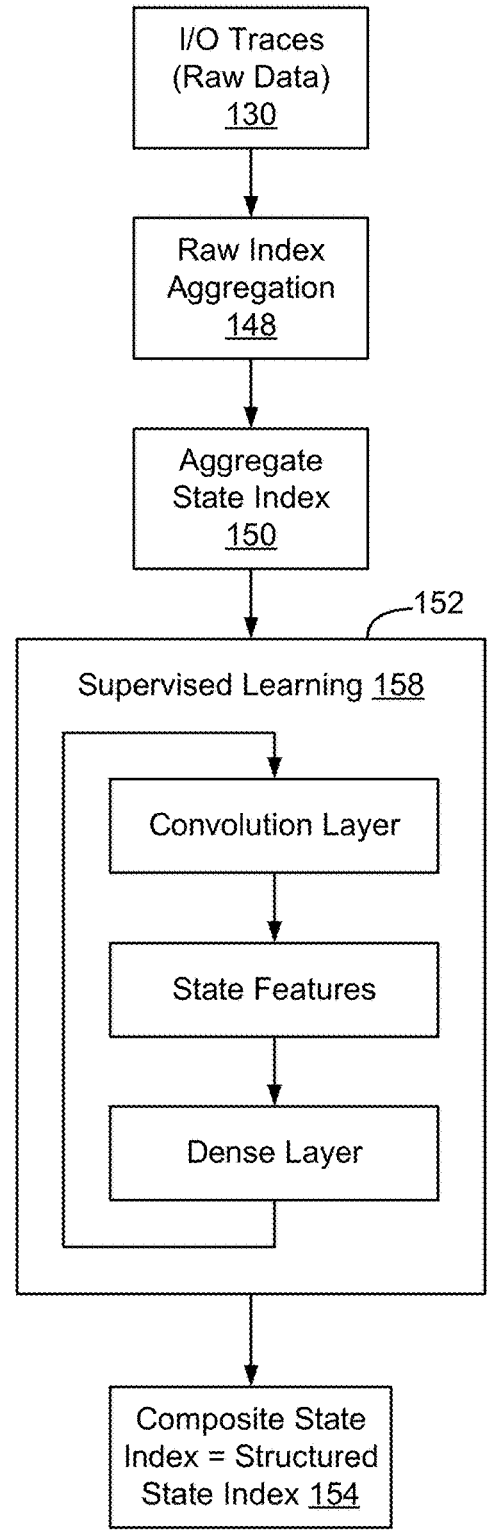

In some embodiments, the state index composition process 152 is implemented as an unsupervised learning process 156, a supervised learning process 158, or as a combination of both an unsupervised learning process 156 and a supervised learning process 158. FIGS. 5 and 6 show the system of FIG. 4 in greater detail. In particular, in FIG. 5 the state index composition process 152 is implemented as an unsupervised learning process 156, and in FIG. 6 the state index composition process 152 is implemented as a supervised learning process 158.

In some aspects of the description contained herein, an example is provided that focuses on creating a structured state index that contains compact and adequate state representations of disk access patterns in large-scale storage systems 100 for predicting cache hit-rates. This example focuses on the prediction of cache hit-rates as a target metric, due to the importance of that metric for the parametrization and management of cache policies. However, the concepts described herein generalize to other metrics, and the proposed state representation can be leveraged for determining policies relative to other metrics, such as 1) prediction of disk access patterns to pre-fetch data into caches, 2) properly dimensioning disk RAIDs to better serve specific workloads, and 3) clustering applications based on disk access patterns. The correct characterization of disk access patterns is an important pre-processing step for any of those solutions.

In some embodiments, the approach to creation of a structured state index is based on the determination of the state space from the raw trace of disk accesses, followed by the extraction of features and subsequent performance evaluation of the proposed characterization for predicting cache hit-rates.

In some embodiments, the task of disk access characterization is referred to as the task of building a time series describing the evolution of the system states related to disk access in a storage system 100. The characterization of disk access patterns poses a series of challenges related to the volume, dimensionality, temporality and quality of the data.

The raw state space of the caching problem is large and requests to disk addresses can be very sparse. The raw disk access characterization refers to one such characterization wherein the locations in the disk accesses at any point in time in are tracked, along with the type of access (reads, writes, etc.). This comprises a huge volume of data. Therefore, it is important to carefully select the features that are used as part of the state characterization.

In contrast to the raw data, an engineered access characterization series comprises a purposefully structured and filtered series of selected relevant features of the raw data. This engineered series ideally contains a summary of the relevant information for the task at hand. In some embodiments, the state representation must account for the previous history of the system, while still encapsulating all the information required for decision-making. Encapsulating information from a short window of time may not suffice for decision-making purposes, whereas a long window may cause either a state space explosion or the use of stale data.

In some embodiments, an efficient approach to characterize disk access patterns is provided which can be deployed online to determine the current state of the system with respect to disk accesses. The state representation captures the recent history of accesses to the disk, in a compressed fashion.

Characterization of disk access patterns of large-scale storage systems 100 is difficult because of the scale of the address space, the large number of I/O operations, and the temporal nature of the data. For example, the address space of disk accesses in a storage system 100 is very large, which precludes the use of raw addresses as elements of the state space. Furthermore, large scale storage systems 100 generate enormous amounts of disk access log data. Accordingly, the I/O traces (raw data) 130 itself is not sufficient to capture meaningful patterns in the disk access data. By determining adequate and compact state representations, it is possible to capture meaningful patterns in the disk access data, which thus enable the application of reasoning techniques.

In some embodiments, it is important to account for the history of disk access data since instantaneous snapshots may not represent important trends that support automated decision-making. For instance, in caching applications the achievable hit rate may significantly vary over time. The temporal aspects must be considered in a parsimonious manner, however, due of the tradeoff between expressiveness and memory requirements. A fine-grained characterization of historical data may lead to a more detailed state space at the cost of increased memory requirements. A coarse-grained characterization, in contrast, may naturally reduce the data volume, but become insufficient for the purposes of the final application of interest.

The quality assessment regarding the characterization of disk accesses is non-trivial and application dependent. Quantitative approaches to automatically compare different characterizations are important for continuous improvement.

In some embodiments, the decision-making task 142 is implemented as a deep learning process that takes vectors of features as input data. Such features must be simple enough to be directly obtained from the dataset in real time, although they still need to convey sufficient information to let the deep neural network implemented decision-making task to generate meaningful results. The normalization of features may play an important role at this stage.

Finding an adequate state representation is important to successfully support automated decision-making. The features (state variables) that comprise the state should capture the essential aspects of the system to predict system operational parameters. Such features are also referred to as descriptors. The descriptors must capture the recent history of the system. For example, in statistics methods, rolling windows over time series constitute one example of state features that capture history (in that case, a set of samples of the past).

In some embodiments, an approach to characterizing the system state is similar in intuition. However, instead of using a statistical metric (such as mean or standard deviation), in some embodiments a structured histogram of the features over the window of interest is collected to form an aggregate state index. A time window of size w is used to determine the amount of previous history that is conveyed at each state, depending on the domain. This aggregate state index representation is then used in (optional) feature enrichment steps to yield an engineered characterization series called a composite state index. As noted above, the aggregate state index and composite state index are interchangeably referred to as the structured state index.

In some embodiments, the aggregated state index is a series of states. Since the state must contain sufficient information to make decisions, while at the same time being simple enough to be easily stored and parameterized, each state is composed of data from a window comprising the previous w disk accesses. Formally, the current state S[t] at time t is a vector of D values, where D is also referred to as the state dimension.

To determine the state vector at time t, S[t], for each time instant t, determine the state S[t] based on the windowed histogram of the trace of disk accesses. Let w be the window size. At each time instant, take the last w events in the trace and create a histogram with h bins. In this discussion, it is assumed that the windows of events used to build the histograms are overlapping, but the method easily extends to non-overlapping windows. The algorithm StateIndexAggregation implements the process described above. In some embodiments the process of determining the aggregate state index is implemented as:

StateIndexAggregation(R, T, w, h, step):
1. S←[ ]
2. i←w
3. j←0
4. while i<=length(R):
5. samples←R[j: i]
6. s←Distribute(samples, T, h)
7. i←i+step
8. S[j]←s
9. j←j+step
10. end while
11. return S The algorithm StateIndexAggregation receives, as arguments, the raw state index R, the size of the address space of the storage system T, the size of the windows (in samples) w, the number of bins h, and the step size. The StateIndexAggregation returns the StateIndex structure S as a list of states. The step argument determines whether the windows are overlapping or non-overlapping. If the step argument is 1, we have the method described above. If the step argument is greater than or equal to w, the windows are non-overlapping. The higher the step, the more most-recent traces from the raw data R are potentially ignored. The auxiliary method Distribute distributes the w samples across the h bins, where each bin corresponds to a contiguous sequence of T/h raw addresses, and returns a state s as an h-dimensional vector.

Figure 8:
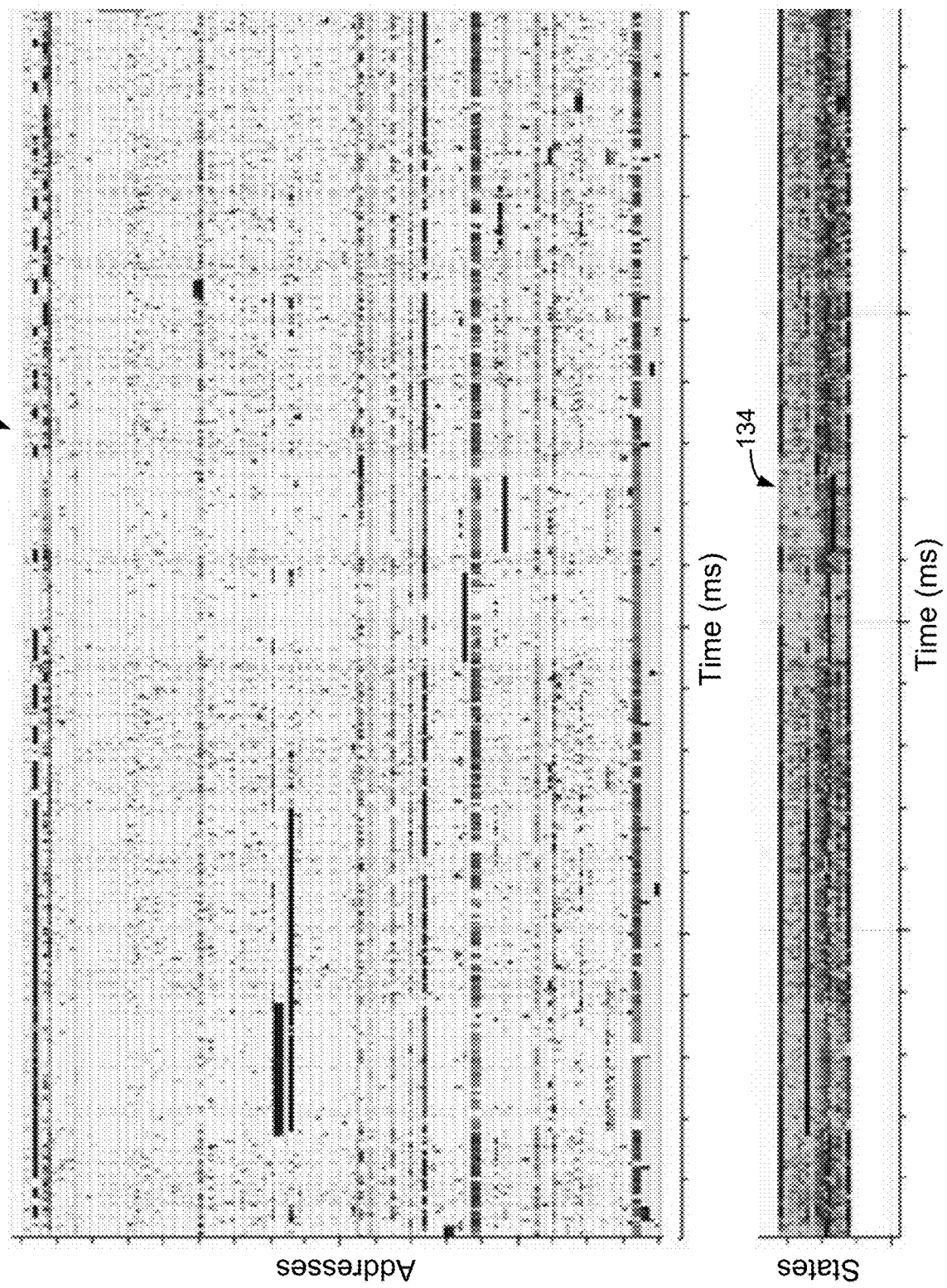
FIG. 8 is a set of two graphs, in which the top graph shows I/O operations on a storage system 100 over time, and the bottom graph shows the structured state index computed from the raw I/O data shown in the top graph.

In some embodiments, the StateIndexAggregation algorithm is configured to store each state as a list s such that the i-th element of the list represents a state s(i). In this example the state has dimension h, i.e. D=h. The resulting aggregate state index in one of our experiments is shown in FIG. 8, in comparison with the raw data 130. The following equations show one example of how each of the h elements s(h) of the state s may be calculated, according to some embodiments:

$$s(0) = \sum_{0}^{\frac{T}{h}-1} R(t) + \sum_{0}^{\frac{T}{h}-1} R(t-1) + \sum_{0}^{\frac{T}{h}-1} R(t-2) + \ldots + \sum_{0}^{\frac{T}{h}-1} R(t-w)$$

$$s(1) = \sum_{\frac{T}{h}}^{\frac{2T}{h}-1} R(t) + \sum_{\frac{T}{h}}^{\frac{2T}{h}-1} R(t-1) + \sum_{\frac{T}{h}}^{\frac{2T}{h}-1} R(t-2) + \ldots + \sum_{\frac{T}{h}}^{\frac{2T}{h}-1} R(t-w)$$

$$s(2) = \sum_{\frac{2T}{h}}^{\frac{3T}{h}-1} R(t) + \sum_{\frac{2T}{h}}^{\frac{3T}{h}-1} R(t-1) + \sum_{\frac{2T}{h}}^{\frac{3T}{h}-1} R(t-2) + \ldots + \sum_{\frac{2T}{h}}^{\frac{3T}{h}-1} R(t-w)$$

...

$$s(k) = \sum_{\frac{kT}{h}}^{\frac{(k+1)T}{h}-1} R(t) + \sum_{\frac{kT}{h}}^{\frac{(k+1)T}{h}-1} R(t-1) +$$

$$\sum_{\frac{kT}{h}}^{\frac{(k+1)T}{h}-1} R(t-2) + \ldots + \sum_{\frac{kT}{h}}^{\frac{(k+1)T}{h}-1} R(t-w)$$

...

$$s(h-1) =$$

$$\sum_{\frac{(h-1)T}{h}}^{T-1} R(t) + \sum_{\frac{(h-1)T}{h}}^{T-1} R(t-1) + \sum_{\frac{(h-1)T}{h}}^{T-1} R(t-2) + \ldots + \sum_{\frac{(h-1)T}{h}}^{T-1} R(t-w)$$

As shown in these equations, in some embodiments each element s(i) includes w sums of access I/O operations R over a contiguous range of T/h addresses of storage resources 114 of storage system 100. This enables the state index to include a sum of access I/O operations R during the previous w sampling intervals (t−1), (t−2), . . . (t−w). Although not shown in these equations, optionally each of the sums may be weighted using a weighting factor to reduce the influence of older I/O operations on the aggregate state index. For example, a weighting factor of between 0 and 1 might be applied to any of the ΣR(t−w) factors, to reduce the influence of the older I/Os (I/O patterns that occurred further in the past) on the aggregate state index. Many ways of computing the aggregate state index may be utilized depending on the particular implementation.

Figure 11:
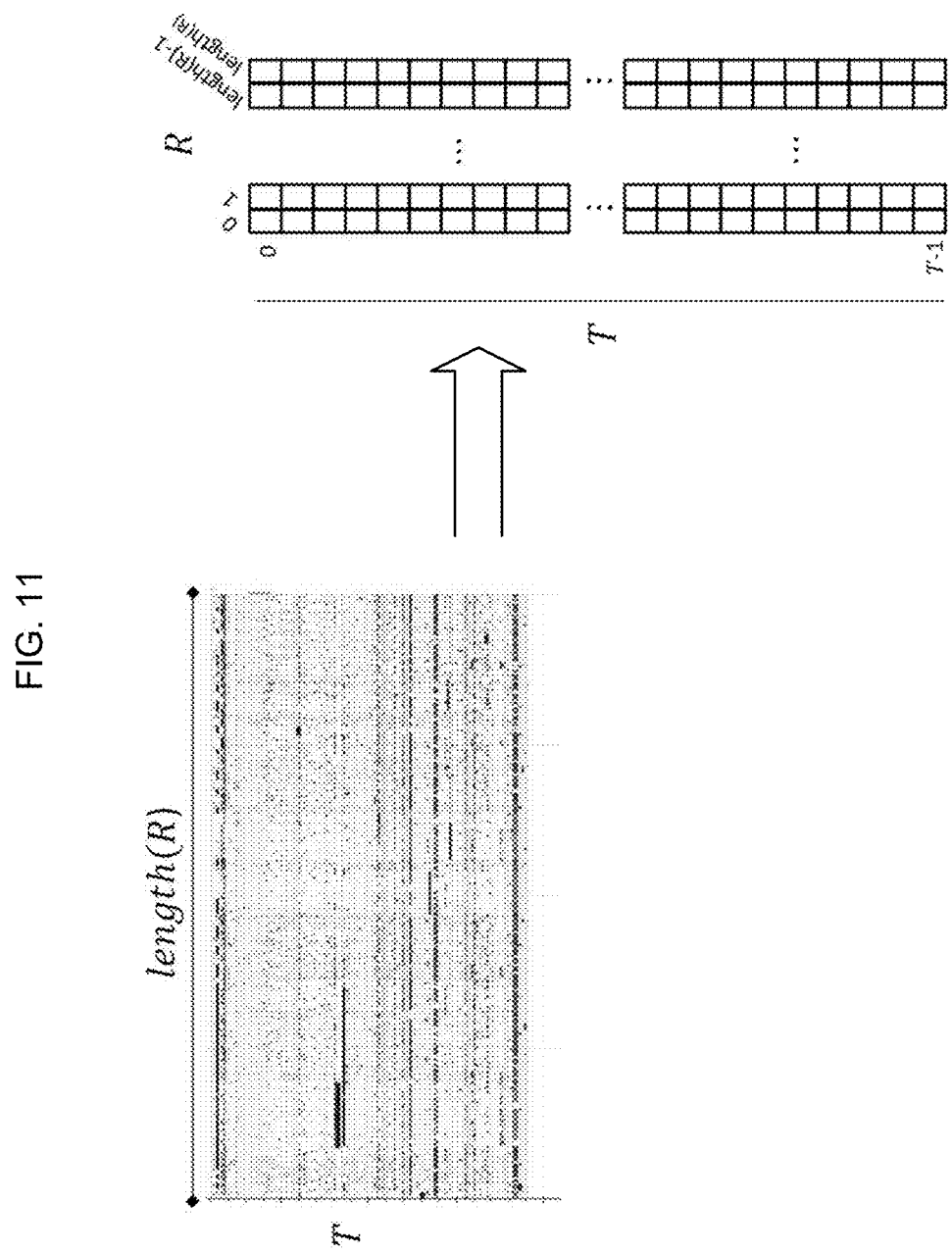
FIGS. 11, 12A, 12B, 13A, 13B, 14A, 14B, 15A, and 15B visually depict one example process of creating a structured state index from raw data according to some embodiments.

FIGS. 11, 12A, 12B, 13A, 13B, 14A, 14B, 15A, and 15B visually depict one example process of creating a structured state index from raw I/O trace data according to some embodiments. The left side of FIG. 11 shows the raw I/O trace data. The x axis is time and the y-axis is the address space T. A dot indicates an I/O operation at the address T at a particular point in time. As shown on the right side of FIG. 11, the raw I/O trace data is divided into time sampling intervals (columns O-R) in which each time sampling interval has a set length. For example, if the length of the sample is 1000 ms, then each time sampling interval might be 1 ms. For convenience, the individual addresses from 0 to T−1 are shown as blocks forming the columns on the right-hand side of FIG. 11.

Figure 12B:
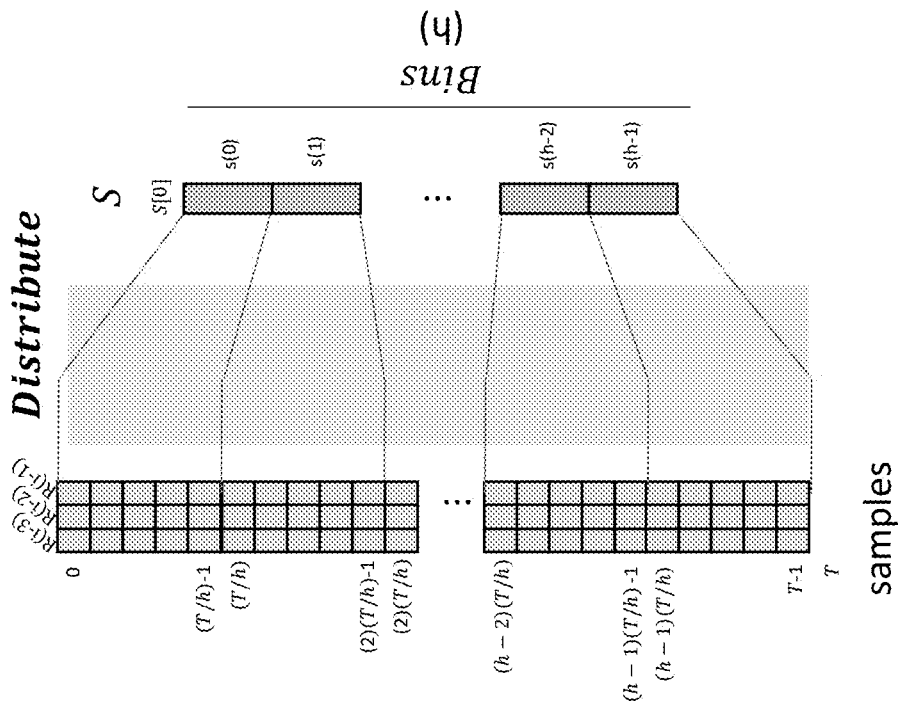
Figure 12A:
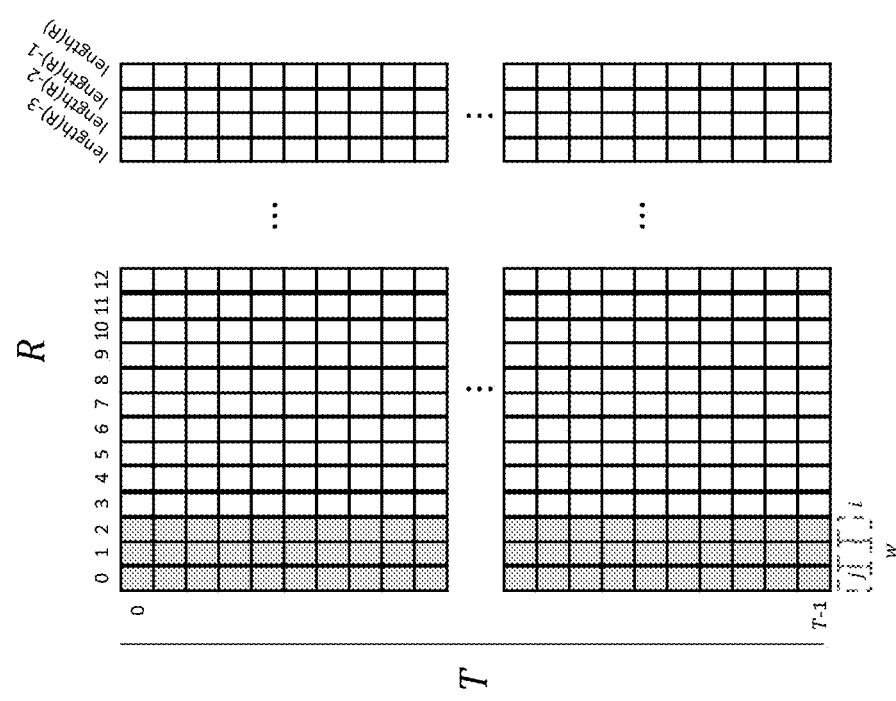

FIGS. 12A, 12B, 13A, 13B, 14A, 14B, 15A, and 15B show how the samples are used to create the states that form the structured state index, using an example window size w=3. As shown in FIG. 12A, because the window size w=3 is being used, a first set of three samples 0, 1, 2, is initially selected to be used to create the first state S[0]. FIG. 12B shows how the samples in the first set of samples is distributed into h bins, such that I/O operations that occur within the first three time intervals over contiguous sets of addresses are used to create state S[0]. As shown in FIG. 12B, state S[0] is a vector of length h, having components s(0)-s(h−1), in which each s component is computed using the equations set forth above.

Figure 13B:
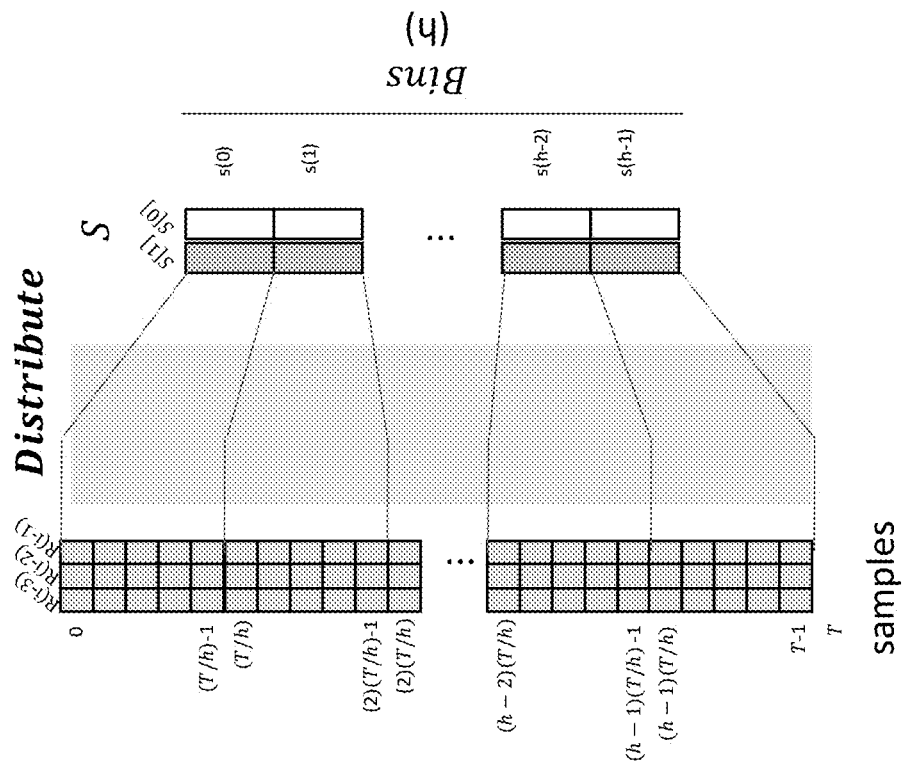
Figure 13A:
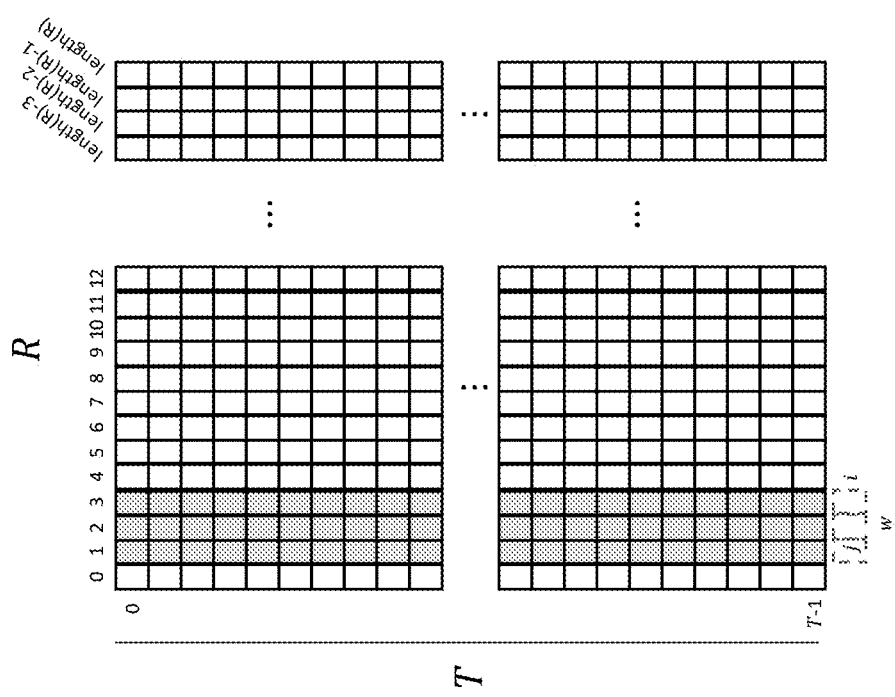
Figure 14B:
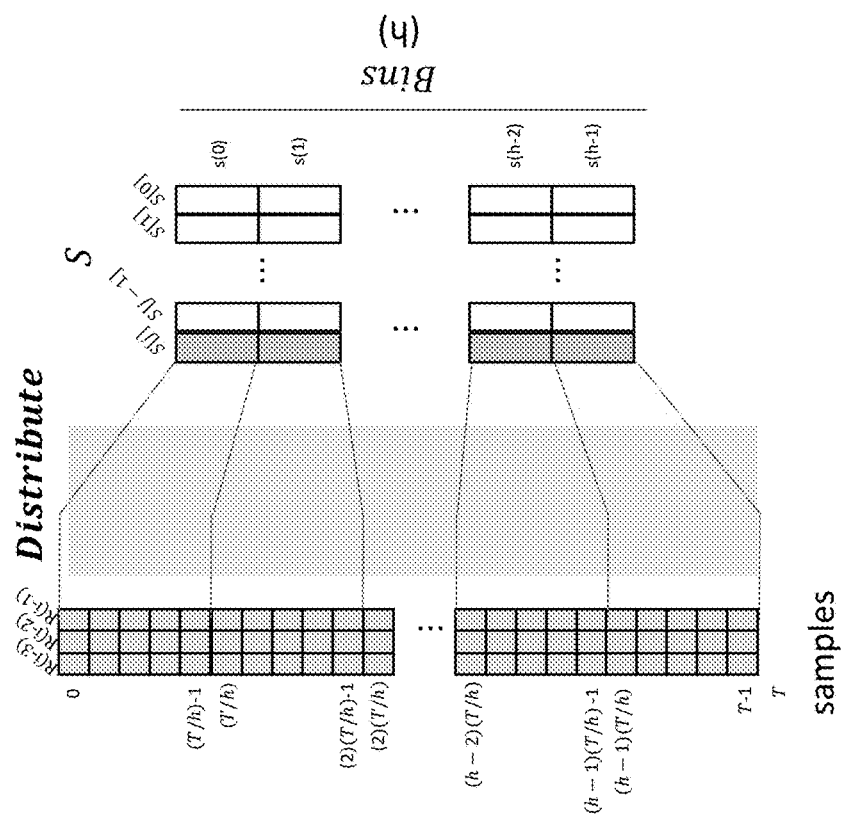
Figure 14A:
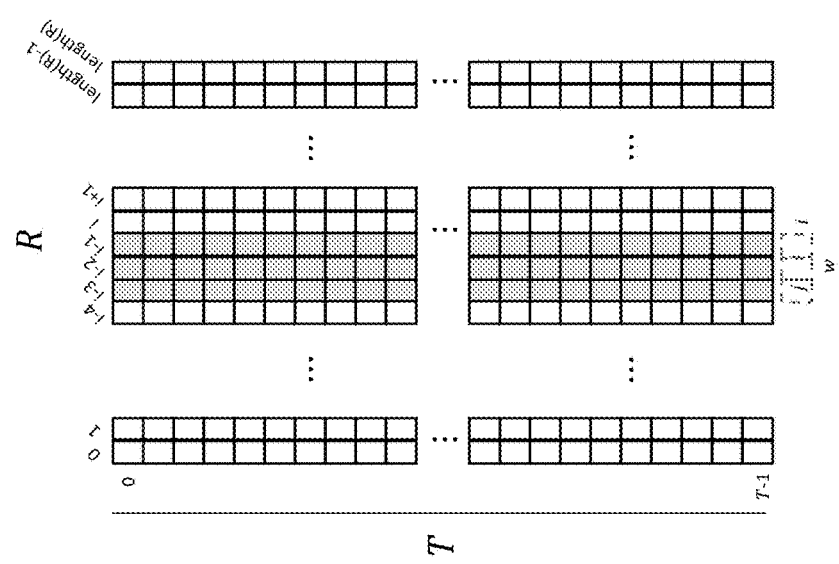
Figure 15B:
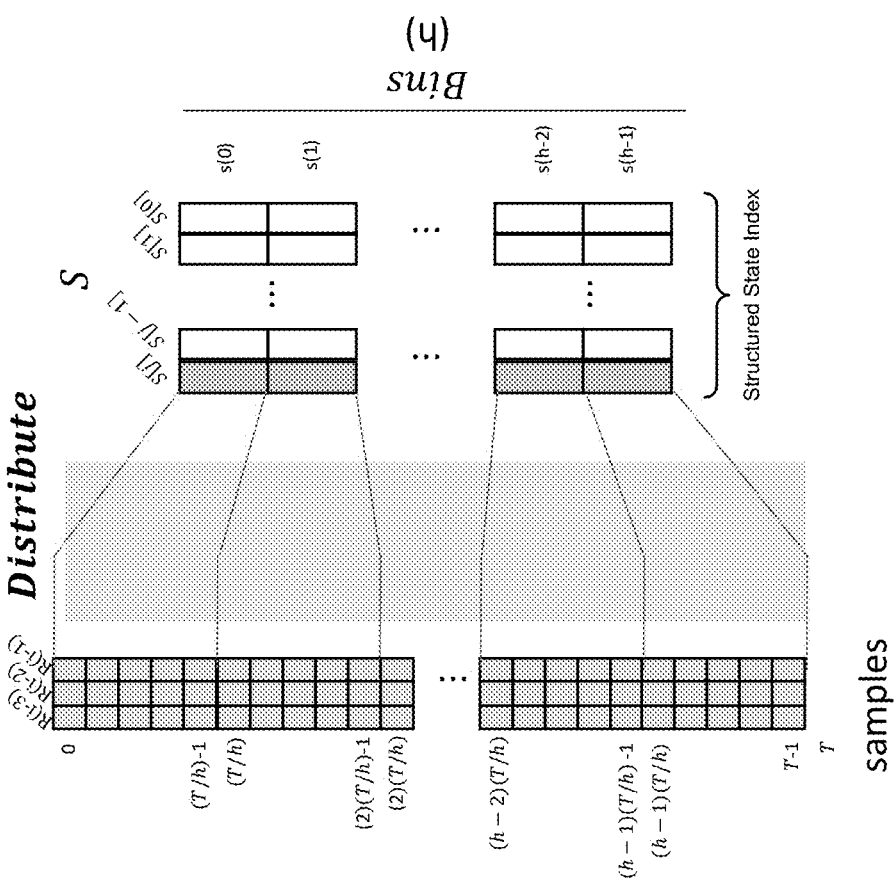
Figure 15A:
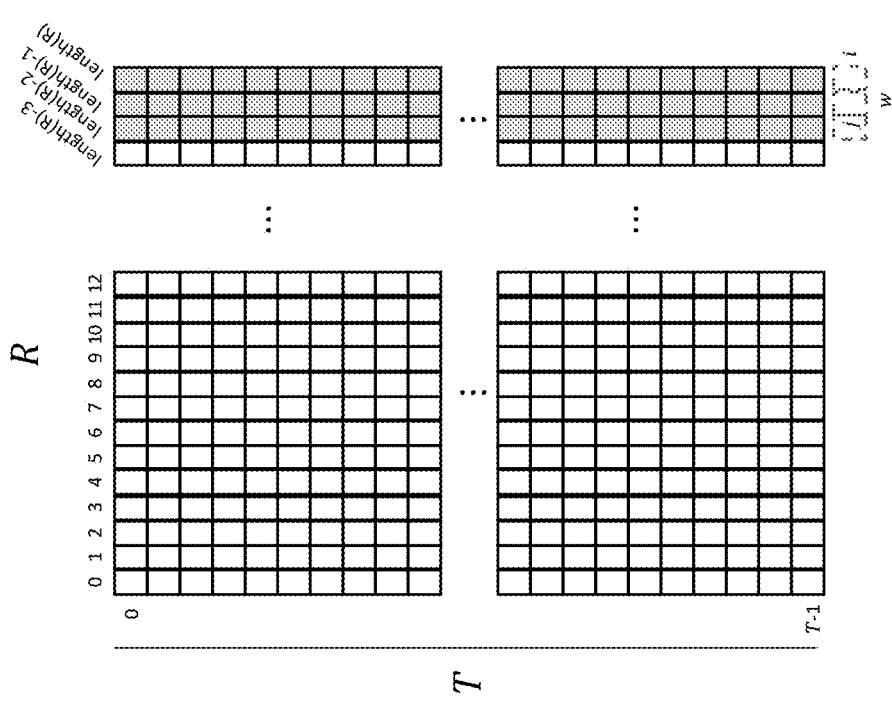

As shown in FIG. 13A, a second set of three samples 1, 2, 3, is then selected and used to create state S[1]. As shown in FIG. 13B, the samples in the selected sampling intervals are distributed into h bins s(0)-s(h−1) to create state S[1]. This process iterates taking subsequent sets of three samples, as shown in FIGS. 14A, 14B, 15A, and 15B, to create each of the states S[0]-S[j]. Collectively, the states S[0]-S[j] make up the structured state index.

FIG. 8 shows raw disk access I/O trace R (top graph) and an example implementation of the aggregate state index (bottom graph). In the raw data (top graph), each row corresponds to an address in the disk, and each data point corresponds to a read or write operation in the address across time. Thus, the y axis corresponds to the different disk positions and the x axis corresponds to time. The example shown in FIG. 8 was formed from roughly 3 minutes of I/O operations. A point is marked at position (x, y) if there is a disk access to disk position y at time x.

The bottom graph of FIG. 8, shows the aggregate state index. On the y axis are the states—i.e., the accesses in the time window to a set of contiguous addresses in the raw state, summed during the current time interval and the previous w time intervals. The x axis of the bottom graph is time. That is, a point is darker at position (x, y) signaling a higher the number of accesses to the contiguous addresses corresponding to the address space range y in the last w samples observed at time x.

This aggregate state index representation achieves three goals. First, it is straightforward to compute, and can be reasonably performed over large amounts of data in an offline fashion. Second, it results in a structured, compact series of states that comprises the relevant information for decision-making (e.g. cache hit-rate prediction). Third, due to its structure, it lends itself to traditional machine learning techniques for the extraction of additional features from the data. The last item makes it possible to perform additional processing on the aggregate state index to form a composite state index.

In some embodiments, forming a composite state index annexes additional features to the state representation. While the aggregate index comprises a series of histograms of disk accesses to contiguous address ranges over time windows, in the composite state index the states comprise features built upon those histograms and their relations over time. While there is a loss of interpretability, this can greatly increase the quality of the data regarding the target metric. In some embodiments, composition techniques are deployed to increase feature robustness such as adding noise to the input, randomly dropping out some of the learned parameters (dropout), and normalizing the input (batch normalization).

In some embodiments, the process of forming a composite state index is implemented by leveraging modern machine learning techniques such as auto-encoders and Visual Geometry Group (VGG)-like deep neural networks (DNNs). These take, as input, time series data (such as the aggregate state index) and output additional state features. These additional features are obtained by applying filters (e.g., convolutions) which provide different perspectives on the data. The most relevant filters (perspectives) are chosen. Alternatively, unsupervised techniques (e.g. auto-encoder neural networks) can be used to extract features or to reduce the dimensionality of the feature space. In some embodiments, either (or both) approaches are used as an optional step that results in a composite state index. FIGS. 5-6 show representations of these possible approaches. Although FIGS. 5-6 show embodiments designed to implement composite processing using auto-encoder (unsupervised learning 156) and convolutional deep neural networks (DNNs) (supervised learning 158), alternative and more sophisticated feature extraction methods could be used depending on the domain application and desired decision-making task 142.

Note that such features, as in general machine learning applications, are also helpful for additional purposes, including the visualization of the overall system state, and reverse engineering user applications and processes that are being executed in the system, in a privacy preserving manner, as well as assessing the impact of those applications on system performance.

In box 136 of FIG. 2, the structured state index 134 (i.e. either the simplified state index extracted from the raw data, or a composite state index with additional features obtained via machine learning) is validated against the target metric 140. In some embodiments the structured state index 134 is validated against the target metric 140 as a pre-requisite for training of the decision-making task, and potentially periodically again while the trained decision-making task 142 is used to predict operational parameters of the storage system based on proposed policies.

The quality of the state characterization is then assessed by computing the cross-correlation between the time series of states visited by the proposed state representation and the target metric of interest, i.e. hit rates of a cache policy. A pragmatic approach is used to assess the performance of the proposed characterization through the comparison of the performance of the ultimate application of interest against other alternative state characterizations.

As noted above, in some embodiments the structured state index 134 is created with an intention that the structured state index be used to train a decision-making task 142 implemented as a deep neural network, to enable the decision-making task 142 to predict with some reasonable accuracy a target metric 140 of the storage system 100. For example, if the target metric 140 is a cache hit-rate, the intent is for the decision-making task 142 to learn a correlation between the structured state index 134 and cache hit-rate, so that the decision-making task 142 can be used to model execution of the storage system 100 under alternate storage policies. In some embodiments, the state index validation process of box 136 is used to validate the structured state index 134 to confirm that there is a correlation between the state features in the structured state index 134 and the target metric 140 of interest in domain applications. If there is no correlation at this stage (a determination of NO at block 138), the state index structuring process 132 is adjusted to increase the correlation between the structured state index 134 and the target metric 140 of interest.

For example, in an embodiment where the StateIndexAggregation algorithm receives, as arguments, the raw state index R, the size of the address space of the storage system T, the size of the windows (in samples) w, and the number of bins h, and the method Distribute distributes the w samples across the h bins, if there is insufficient correlation between the structured state index 134 and the target metric 140, the state index structuring process 132 may be adjusted by modifying the target window w to increase or decrease the number of samples considered (adjusting the time window over which the samples are averaged). Additionally, the number of h bins may be adjusted to increase/decrease the number of bins to provide more granular or less granular state information about the access patterns of the storage system 100. Likewise, where one or more learning processes 156, 158 is used to composite the aggregate state index to form the structured state index, an alternate model may be used to extract/accentuate different or additional features from the aggregate state index.

In some embodiments, the structured state index is validated by:
(1) Determining relevant parameters of the domain for the target metric, potentially relying on other domain tasks when this information is available;
(2) Computing the cross-correlation between the features of the states and the parameters; and
(3) Checking if the cross-correlation is satisfactory: if the cross-correlation is satisfactory, keep that state representation. Otherwise, modify it and go back to step 2.

For example, one way to adjust a storage system 100 is to adjust the size of the pre-fetch window (look-ahead) policy for the cache policy. The look ahead parameter determines how much additional data is loaded to the cache 116 for each requested read operation. That way, if the next read operation uses contiguous data, the data is already in the cache. By adjusting the size of the pre-fetch window, it is therefore possible to change the cache hit-rate. If the pre-fetch window is too small, not enough contiguous data will be loaded to the cache thus causing cache misses for consecutive data read operations, which lowers the cache hit-rate. If the pre-fetch window is too large, additional unnecessary data will be loaded to the cache, which reduces space in the cache that could be used for other more relevant data, which likewise lowers the cache hit-rate.

In some embodiments, determining that the structured state index 134 is valid relative to the target metric (pre-fetch window size), may be implemented using the following process:
(1) Given a trace of disk accesses, finding the optimal tuning of the look-ahead parameter for that trace or simulate the system for different look-ahead parameter values (e.g., each simulation keeping the look-ahead at a constant fixed value). Ideally, given enough time and resources, it is possible to find the optimal parameter tuning. Otherwise, heuristics may be used to determine a good (as opposed to the optimal) solution.
(2) Computing the correlation between the state features and the distribution of cache hits for different cache parameters.
(3) Correlation between these two sets of metrics suggests whether the features in the structured state index capture the information required for decision-making. Otherwise, modify the manner in which the structured state index is calculated and go back to step 2.

This is an important step of the approach, which allows the process to preemptively detect that a state index structuring has discarded relevant data, as evidenced by the experimental validation.

For example, if the structured state index produced is considered unfit for the target metric due to an observed temporal drift, that is an indication that the window size (parameter w) used in calculating the simplified state index composition should be increased. If the state characterization is unfit only when certain states s(i) are considered, that is an indication that the bins (parameter h) should be refined. Since this process is straightforward and domain dependent, a person skilled in the art could implement the reparameterization step in an adequate manner.

Given a validated structured index, it can be provided as input to the decision-making task 142 to train a deep neural network implementing the decision-making task 142 to learn a correlation between the structured state index 134 and the target metric 140 of interest. Once the decision-making task 142 has been trained, it may be used to generate a predicted metric 144 of the storage system 100 based on a proposed policy 146. For example, in an embodiment where the target metric 140 is a cache hit-ratio and the proposed policy is a change in the size of the look-ahead window, a trained decision-making task 142 is able to generate a predicted cache hit-ratio that would be expected from the storage system 100 if the look-ahead window size is changed. Based on the result of the predicted metric, if the decision-making task shows that the cache hit-ratio would be expected to increase if the proposed policy 146 were to be implemented, the storage system management and control application 118 may cause the cache manager 120 to implement the proposed policy 146 to adjust the manner in which the cache 116 is utilized in the storage system 100.

In some embodiments, the validation aspect of the method also includes the periodical observation of the target metric in the decision-making application during the training phase. As noted above, part of the method includes training the decision-making function (DNN) to teach the DNN to predict the target metric of interest. For example, if the target metric 140 is cache hit ratio, the DNN is trained using the structured state index 134 to learn a correlation between the states of the structured state index 134 and the cache hit ratio. In some embodiments, the training process is observed during the intermediate steps of the training process to determine if the DNN is converging toward a trained state. By observing the prediction of the cache hit rates from the intermediate steps in the training of the DNN, for example by observing the training loss values in-between epochs, it is possible to determine if the DNN is converging toward a stable state. This is a domain-dependent decision, but if the target metric does not perform well in practice during the decision-making application, the state index structuring process 132 is adjusted (arrow 160 in FIG. 2) to create a new structured state index, that is then passed to the state index validation process 136.

In some embodiments, periodical observation of the target metric is performed in the decision-making task 142, after the decision-making task 142 has been trained and while the decision-making task 142 is being used to generate predictive metrics 144 to validate that the structured state index 134 is still correlated with the target metric 140. For example, the actual observed cache hit-ratio may be compared with the predicted cache hit-ratio computed by the decision-making task 142 to determine whether the structured state index 134 remains sufficiently correlated with the operational parameters of interest in the storage system 100. Accordingly, in some embodiments the method includes the periodical observation of the target metric predicted by the decision-making application 142. This is a domain-dependent decision, but if the target metric does not perform well in practice while the decision-making application 142 is being used, a new structuring of the structured state index is implemented as shown by line 160.

In some embodiments, for example, the decision-making task 142 is a trained neural network that receives a state from the structured index and the parameters of a cache policy and returns a predicted cache hit-rate of that policy for the time instant represented by the state. Periodically, the output of the decision-making policy is validated using a periodical validation check to verify that the cache hit-rate predicted by the trained neural network is sufficiently correlated to the actual cache hit-rate of the storage system 100 during the time instant represented by the state.

Experimental testing was done to illustrate the validation process. To that aim, a set of traces of a cache were executed under the (segmented) Least Recently Used (LRU) policy with an additional look-ahead parameter, hereinafter referenced as look-ahead-LRU. Various possible values of the two parameters of the policy were tested in a simulator: look-ahead and a.

In this experiment, the a argument dictates the cache split space between content that so far has been requested only once, and content that is requested at least two times and hence is assumed to be more likely to be requested again. For the purposes of explaining the experimental setup, the details about the meaning of the parameters are not relevant. It suffices to know that the caching policy is a parametric policy, which produces different hit rates depending on its two parameters.

Figure 9:
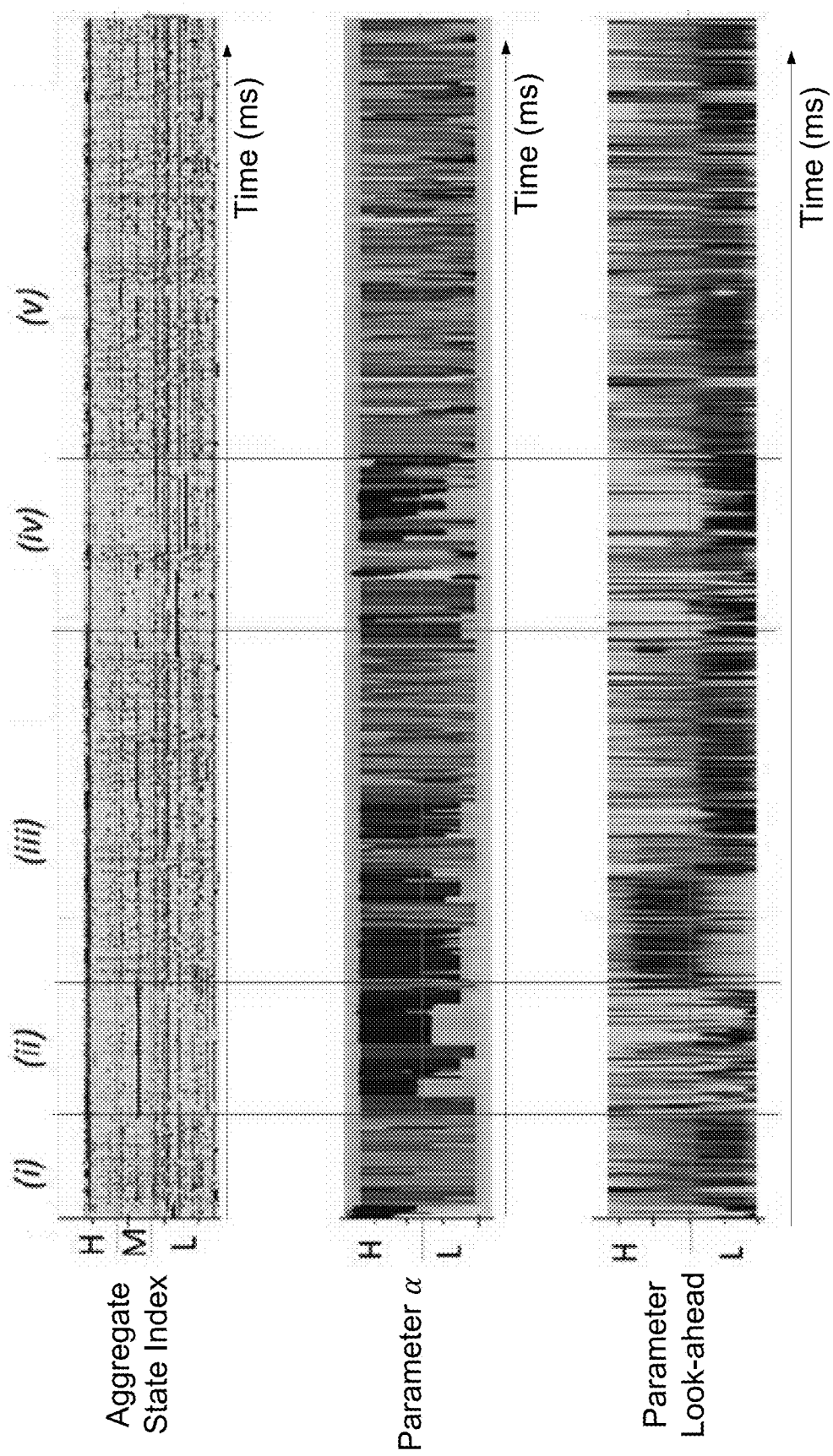
FIG. 9 is a set of three graphs. The top graph of FIG. 9 shows the computed aggregate state index of a storage system 100 over a set of time intervals. The middle graph shows the cache hit ratio for various a values over the time interval, and the bottom graph shows the cache hit ratio for various look-ahead values over the time interval.

FIG. 9 shows how the result of the experiment. In FIG. 9, the top graph shows the aggregate state index and shows how the aggregate state index varies as a function of time. In FIG. 9 (top graph), the collection of aggregate states is shown, where a darker point indicates more accesses to a given disk region. The middle graph of FIG. 9 shows the distribution of hit rates over time for different values of parameter a, under a look-ahead-LRU policy, where darker points indicate higher hit rates (i.e., better values of the corresponding a parameter). The Y axis of the middle graph of FIG. 9 plots values of the parameter a from high to low, and the X axis shows the cache hit-rate over time. The bottom graph of FIG. 9 shows the distribution of hit rates for different values of the look-ahead parameter (varied from High to Low on the Y axis), under a look-ahead-LRU policy, where darker points indicate higher hit rates (i.e., better values of the corresponding look-ahead parameter).

Comparing FIG. 9 (top) against FIG. 9 (middle) and (bottom), it is clear that a correlation exists between the state description encoded into the aggregate state index and the distribution of the hit rate for various cache parameters. Such correlation suggests that it is possible to exploit the aggregate state index to predict the distribution of hit rates for various parameters.

Consider, for instance, region (i) in FIG. 9. In that region, high (H) and low (L) values of the aggregate state index correspond to most disk accesses, which translate into cache parameters whose optimal values widely vary across their range. In region (ii), in contrast, there is increased activity for medium (M) state indices, corresponding to larger and smaller optimal values for cache parameters a and look-ahead, respectively. This change in behavior suggests that the simplified state index already encodes important information about optimal parameter values.

Nonetheless, additional features may still be required. To appreciate that point, consider region (iii) in FIG. 9. In the middle graph of FIG. 9, in region (iii), it can be observed that the values of look-ahead corresponding to higher hit rates are initially larger and then decrease. However, there is not a clear corresponding transition in the values of the aggregate state indices in region (iii) shown in the top graph of FIG. 9. In the validation step, this indicates that the cross-correlation between the states of the aggregate state index and the target metric is lower than an acceptable threshold. This suggests that it may be necessary to augment the state with additional features (using the composition process of FIGS. 4-6) to evidence such transitions or to reformulate how the structured state index 134 is implemented.

Figure 10:
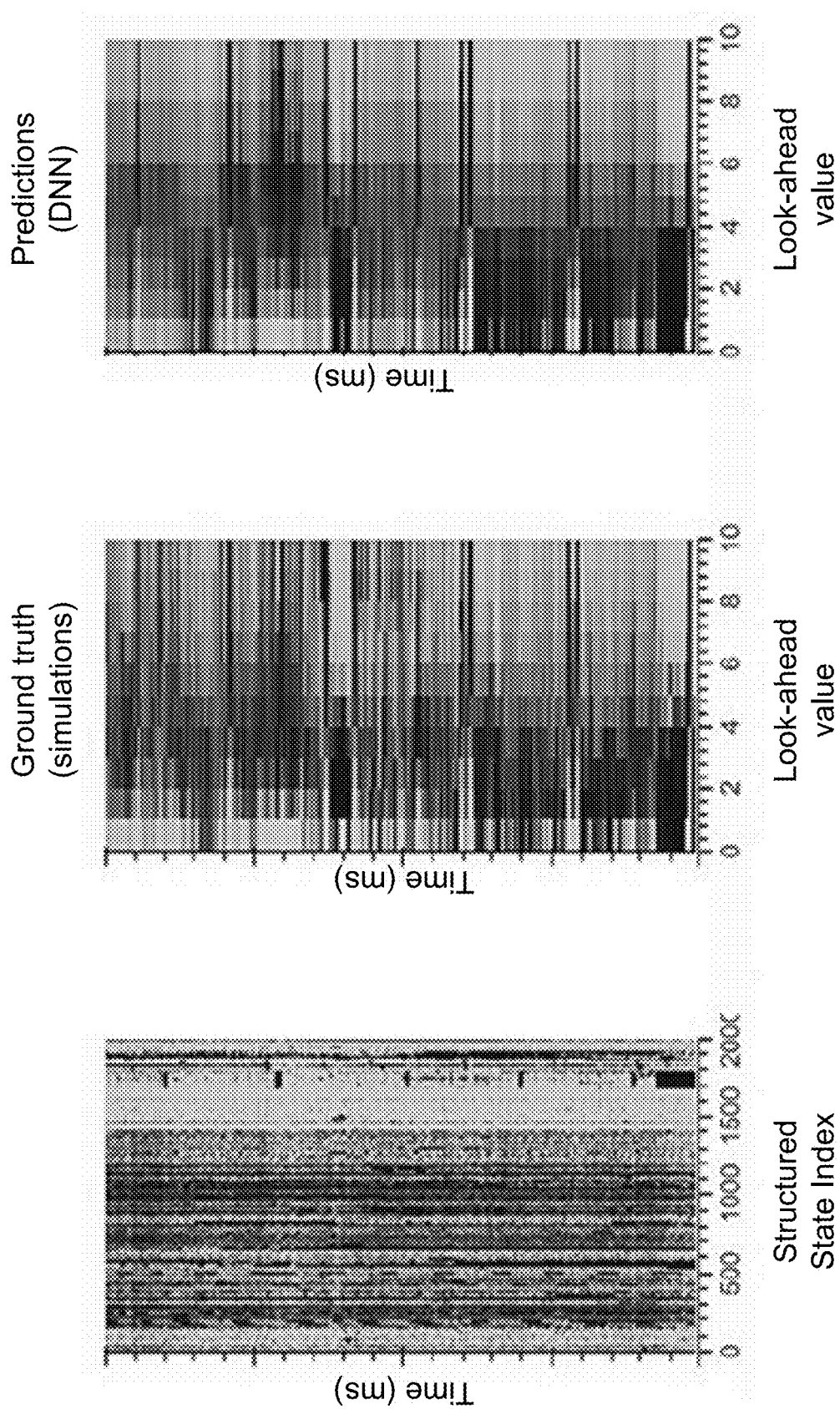
FIG. 10 is a set of three graphs, in which time is on the Y-axis. The left graph shows the computed aggregate state index of a storage system 100 over a time interval. The middle graph shows the actual cache hit rate of the storage system 100 (ground truth simulations) over the same time interval with varying look-ahead values. The right graph shows the predicted cache hit rate of the storage system 100 by a learning process trained using the structured state index over the time interval with varying look-ahead values.

FIG. 10 illustrates the expressive power of the proposed state characterization, in which the left graph shows the states as characterized by the composite state index (i.e. the simplified state index from before, enriched with additional features). This composite (structured) index is compared against the hit rates as observed in simulations (middle graph) and hit rates as predicted by a DNN model that uses the proposed state characterization as input (right graph). In particular, in FIG. 10 the left graph shows the structured state index, where each row represents a state vector s(t). The middle graph shows the target matrix where each row is the measured hit rate distribution for a range of look-ahead values in the simulation. The right graph shows the predicted distribution of hit rates, for the same range of look-ahead values, as predicted by the predictive model (a deep neural network) that comprises the decision-making task 142, where each row represents a predicted vector of hit rates.

FIG. 10 demonstrates the correlation between the output of a deep neural network trained using a composite state index characterized by the proposed approach (right graph), and the target metric (hit rate) as measured in the simulation (middle graph). This means that the structure state index is validated and that the decision-making task may proceed with confidence.

Figure 7:
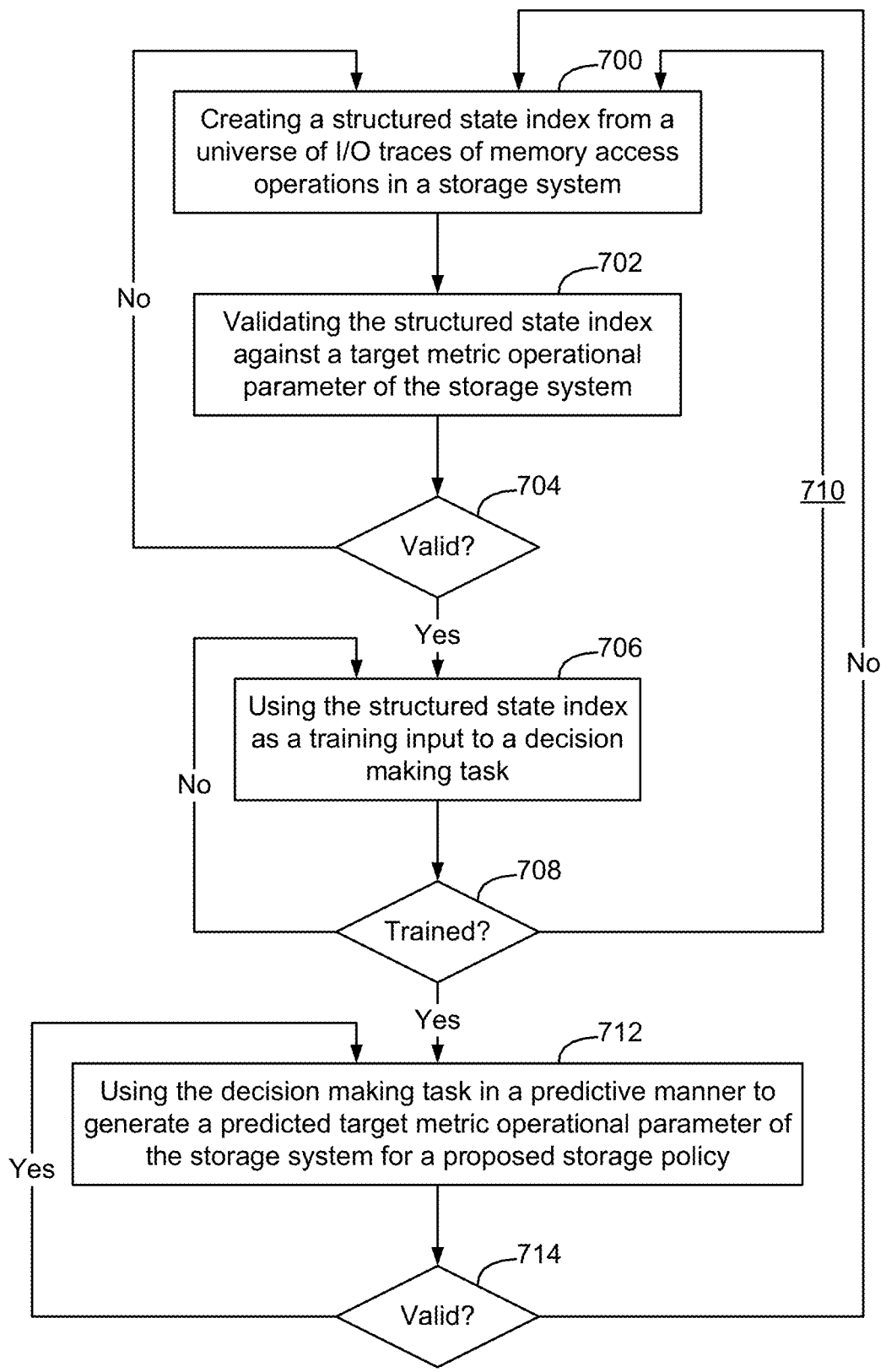
FIG. 7 is a flow chart of aspects of methods of optimizing performance of a storage system 100 according to some embodiments.

FIG. 7 is a flow chart of aspects of methods of optimizing performance of a storage system 100 according to some embodiments. As shown in FIG. 7, in some embodiments the method includes creating a structured state index from a universe of I/O traces of memory access operations (raw I/O data) in a storage system (block 700). The structured state index is then validated against a target metric operational parameter of the storage system (block 702). If the structured state index is determined to not be valid relative to the target metric operational parameter (a determination of NO at block 704), the process returns to block 700 to create a new structured state index.

If the structured state index is determined to be valid relative to the target operational parameter metric (a determination of YES at block 704), the structured state index is used as training input to a decision-making task (block 706). Periodically the output of the decision-making task is evaluated (block 708) to determine if the decision-making task is sufficiently trained. If the decision-making task is not trained (a determination of NO at block 708), the training process continues. If the decision-making task is not converging toward a trained state, the process returns to block 700 to create a new structured state index (arrow 710).

If the decision-making task is determined to be trained (a determination of YES at block 708), the decision-making task is used in a predictive manner to generate a predicted target metric operational parameter of the storage system for a proposed storage policy (block 712). Where the output of the decision-making task indicates that implementing a proposed storage policy would increase the performance of the storage system, the operational parameters of the storage system are adjusted by the storage system management and control application 118 to implement the proposed storage policy to optimize performance of the storage system 100.

Periodically the output of the decision-making task is evaluated (block 714) to determine if the decision-making task is sufficiently correlated with actual operation of the storage system. If the output of the decision-making task sufficiently correlates with the operational parameters experienced by the storage system (a determination of YES at block 714), the method continues to use the trained decision-making task. Otherwise, if the output of the decision-making task does not sufficiently correlate with the operational parameters experienced by the storage system (a determination of NO at block 714), the process returns to block 700 to create a new structured state index (arrow 710).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for optimizing performance of a storage system, comprising the steps of:
    creating a structured state index from raw I/O traces of memory access operations in a storage system;
    validating the structured state index against a target metric operational parameter of the storage system;
    if the structured state index has correlation against the target metric operational parameter of the storage system, using the structured state index as input to a decision-making task; and
    once the decision-making task has been trained using the structured state index, using the decision-making task in a predictive manner to generate a predicted target metric operational parameter of the storage system given a proposed storage policy;
    wherein the structured state index is formed as a series of states, each state being a vector of state elements, and each state element including an aggregate number of I/O operations to a contiguous range of a respective subset of memory addresses over a preceding window of time.

2. The method of claim 1, wherein the decision-making task is a deep neural network and the structured state index comprises input training data for the deep neural network.

3. The method of claim 1, wherein if the structured state index does not have correlation against the target metric operational parameter of the storage system, the method further comprises the step creating a new structured state index.

4. The method of claim 3, wherein the structured state index is created by aggregating I/O operations to a first number of bins of contiguous ranges of memory addresses, and wherein the new structured state index is created by aggregating I/O operations to a second number of bins of contiguous ranges of memory addresses.

5. The method of claim 3, wherein the structured state index is created by aggregating I/O operations over a first time window, and wherein the new structured state index is created by aggregating I/O operations over a second time window.

6. The method of claim 3, wherein the structured state index is created by applying a first aggregation function over I/O operations, and wherein the new structured state index is created by applying a second aggregation function over I/O operations.

7. The method of claim 1, wherein the step of creating the structured state index comprises creating an aggregate state index from the raw I/O traces of memory access operations and compositing the aggregate state index using an unsupervised or supervised learning process.

8. The method of claim 1, further comprising monitoring an output of the decision-making task to determine whether the output of the decision-making task correlates with an operational parameter of the storage system, and re-training the decision-making task if the output of the decision-making task does not correlate with the operational parameter of the storage system.

9. The method of claim 1, further comprising adjusting the operation of the storage system to implement the proposed storage policy when the predicted target metric operational parameter of the storage system output by the decision-making task is more optimal than a current operational state of the storage system.

10. A storage system, comprising:
storage resources;
a set of processors requiring access to data stored in the storage resources;
a cache; and
a storage system management and control application, the storage system management and control application being configured to:
create a structured state index from raw I/O traces of memory access operations to the storage resources;
validate the structured state index against a target metric operational parameter of the storage system;
if the structured state index has correlation against the target metric operational parameter of the storage system, use the structured state index as training input to a decision-making task;
once the decision-making task has been trained using the structured state index, use the decision-making task in a predictive manner to generate a predicted target metric operational parameter of the storage system given a proposed storage policy; and
if the decision-making task determines that the proposed storage policy would improve performance of the storage system, implement the proposed storage policy on the storage system;
wherein the structured state index is formed as a series of states, each state being a vector of state elements, and each state element including an aggregate number of I/O operations to a contiguous range of a respective subset of memory addresses over a preceding window of time.

11. The storage system of claim 10, wherein the decision-making task is a deep neural network.

12. The storage system of claim 10, wherein if the structured state index does not have correlation against the target metric operational parameter of the storage system, the storage system management and control application is configured to create a new structured state index.

13. The storage system of claim 12, wherein the structured state index is created by aggregating I/O operations to a first number of bins of contiguous ranges of memory addresses, and wherein the new structured state index is created by aggregating I/O operations to a second number of bins of contiguous ranges of memory addresses.

14. The storage system of claim 12, wherein the structured state index is created by aggregating I/O operations over a first time window, and wherein the new structured state index is created by aggregating I/O operations over a second time window.

15. The method of claim 12, wherein the structured state index is created by applying a first aggregation function over I/O operations, and wherein the new structured state index is created by applying a second aggregation function over I/O operations.

16. The storage system of claim 10, wherein the storage system management and control application is configured to create the structured state index by creating an aggregate state index from the raw I/O traces of memory access operations and compositing the aggregate state index using an unsupervised or supervised learning process.

17. The storage system of claim 10, wherein the storage system management and control application is configured to monitor an output of the decision-making task to determine whether the output of the decision-making task correlates with an operational parameter of the storage system, and re-train the decision-making task if the output of the decision-making task does not correlate with the operational parameter of the storage system.

* * * * *